(12) United States Patent
Lehman

(10) Patent No.: US 11,712,004 B2
(45) Date of Patent: Aug. 1, 2023

(54) FOLLOWER ASSEMBLY OF A CAM ASSEMBLY FOR A HARVESTER REEL

(71) Applicant: CNH Industrial America LLC, New Holland, PA (US)

(72) Inventor: Barry E. Lehman, York, PA (US)

(73) Assignee: CNH Industrial America LLC, New Holland, PA (US)

( * ) Notice: Subject to any disclaimer, the term of this patent is extended or adjusted under 35 U.S.C. 154(b) by 386 days.

(21) Appl. No.: 16/806,504

(22) Filed: Mar. 2, 2020

(65) Prior Publication Data
US 2021/0267126 A1 Sep. 2, 2021

(51) Int. Cl.
| | |
|---|---|
| A01D 57/03 | (2006.01) |
| A01D 57/04 | (2006.01) |
| A01D 57/20 | (2006.01) |
| A01D 57/12 | (2006.01) |
| A01D 43/10 | (2006.01) |
| A01D 41/14 | (2006.01) |

(52) U.S. Cl.
CPC .............. *A01D 57/03* (2013.01); *A01D 57/04* (2013.01); *A01D 41/14* (2013.01); *A01D 43/10* (2013.01); *A01D 57/12* (2013.01); *A01D 57/20* (2013.01)

(58) Field of Classification Search
CPC ........ A01D 57/03; A01D 57/04; A01D 41/14; A01D 43/10; A01D 57/12; A01D 57/20
See application file for complete search history.

(56) References Cited

U.S. PATENT DOCUMENTS

| 52,327 | A | * | 1/1866 | Seiberling | .............. | A01D 57/04 |
| | | | | | | 56/224 |
| 3,827,110 | A | * | 8/1974 | Dzus, Sr. | .................. | F16B 5/10 |
| | | | | | | 411/348 |
| 4,156,340 | A | * | 5/1979 | Colgan | .................. | A01D 57/03 |
| | | | | | | 56/226 |
| 4,499,712 | A | * | 2/1985 | Klinner | .................. | A01D 43/10 |
| | | | | | | 56/DIG. 1 |

(Continued)

FOREIGN PATENT DOCUMENTS

| CN | 105875057 B | 8/2016 | |
| CN | 208174443 U | * 11/2018 | ............... H02K 7/10 |

(Continued)

OTHER PUBLICATIONS

International Search Report dated Apr. 5, 2018 in International Application No. PCT/US2018/014994.

(Continued)

*Primary Examiner* — Arpad F Kovacs
(74) *Attorney, Agent, or Firm* — Peter Zacharias

(57) ABSTRACT

A follower assembly of a cam assembly for a harvester reel including a baffle, a compressible member adjacent the baffle, and a roller spacer adjacent the compressible member. The follower assembly further includes a tubular cam follower housing the roller spacer, and a fastener extending through the tubular cam follower, the roller spacer, the compressible member and the baffle. The resultant follower assembly provides a construction which minimizes peening of the baffle, whereby the fastener maintains its clamp load such that the cam followers maintain engagement with the cam track and the potential for breakage of the fastener is minimized.

20 Claims, 7 Drawing Sheets

(56) References Cited

U.S. PATENT DOCUMENTS

| | | | | |
|---|---|---|---|---|
| 5,359,839 A * | 11/1994 | Parsons | ............ | A01D 57/03 56/130 |
| 5,595,053 A * | 1/1997 | Jasper | ............ | A01D 57/02 56/226 |
| 6,530,202 B1 * | 3/2003 | Guyer | ............ | A01D 57/03 56/226 |
| 6,591,598 B2 * | 7/2003 | Remillard | ............ | A01D 57/03 56/226 |
| 6,783,453 B2 * | 8/2004 | Bueermann | ............ | A01F 12/40 241/243 |
| 6,843,045 B2 * | 1/2005 | Bickel | ............ | A01D 57/03 56/14.4 |
| 7,146,790 B2 | 12/2006 | Duquesne et al. | | |
| 7,665,287 B2 * | 2/2010 | Jones | ............ | A01D 57/02 56/226 |
| 8,590,284 B2 * | 11/2013 | Rayfield | ............ | A01D 57/03 56/226 |
| 10,426,091 B2 * | 10/2019 | Honey | ............ | A01D 57/04 |
| 2004/0139715 A1 * | 7/2004 | Bickel | ............ | A01D 57/03 56/220 |
| 2006/0201126 A1 | 9/2006 | Remillard et al. | | |
| 2012/0304611 A1 | 12/2012 | Rayfield | | |
| 2017/0059027 A1 * | 3/2017 | Jasper | ............ | F16H 53/06 |
| 2019/0082601 A1 * | 3/2019 | Honey | ............ | A01D 57/03 |
| 2019/0387679 A1 * | 12/2019 | Farley | ............ | A01D 41/14 |
| 2020/0178464 A1 * | 6/2020 | Talbot | ............ | A01D 57/12 |
| 2020/0178466 A1 * | 6/2020 | Remillard | ............ | A01D 57/12 |
| 2020/0256437 A1 * | 8/2020 | Lehman | ............ | F16H 53/02 |

FOREIGN PATENT DOCUMENTS

| | | | | |
|---|---|---|---|---|
| DE | 10215557 A1 * | 10/2002 | ............ | A01D 57/03 |
| EP | 1048199 A1 * | 11/2000 | ............ | A01D 57/03 |
| EP | 1270105 A1 * | 1/2003 | ............ | B21D 22/16 |
| EP | 3123855 A1 * | 2/2017 | ............ | A01D 57/03 |
| WO | 2018140459 A1 | 8/2018 | | |
| WO | WO-2018140459 A1 * | 8/2018 | ............ | A01D 41/14 |

OTHER PUBLICATIONS

Written Opinion of the International Searching Authority dated Apr. 5, 2018 in International Application No. PCT/US2018/014994.

* cited by examiner

FOLLOWER ASSEMBLY OF A CAM ASSEMBLY FOR A HARVESTER REEL

The exemplary embodiments of present invention relate generally to a harvester reel of a plant cutting machine (e.g., a combine harvester) and, more specifically, to a follower assembly of a cam assembly for a harvester reel.

BACKGROUND OF THE INVENTION

An agricultural harvester e.g., a plant cutting machine, such as, but not limited to, a combine or a windrower, generally includes a header operable for severing and collecting plant or crop material as the harvester is driven over a crop field. The header has a plant cutting mechanism, e.g., a cutter bar, for severing the plants or crops via, for example, an elongate sickle mechanism that reciprocates sidewardly relative to a non-reciprocating guard structure. After crops are cut, they are collected inside the header and transported via a conveyor such as a draper belt towards a feederhouse located centrally inside the header.

The header oftentimes includes one or more harvester reels extending in a widthwise direction of the header. The harvester reel includes a frame and a reel assembly and collects crop cut by the cutter bar. The harvester reel delivers the cut crop to the conveyor for transport to the feederhouse. The harvester reel is rotated by a suitable mechanical, electrical and/or hydraulic power source. The harvester reel includes a follower assembly that follows a cam assembly to guide a plurality of support members and crop engaging tines carried thereby to gather cut crop and deliver it to the conveyor. The plurality of support members extend widthwise across the reel assembly and are connected to a central rotating shaft for rotation therewith.

In existing harvester reels there is provided a cam assembly for guiding movement of the support members. Conventional cam assemblies include a cam track, a cam follower, and a baffle. The cam track is connected to the reel assembly, typically to a lateral end of the reel assembly. The cam follower is connected to one of the support members and engages the cam track. The cam follower is also connected to the baffle by a bolt or similar fastener. The baffle is proximate the cam follower for deflecting crop material from wrapping around the cam track and cam followers that guide the tine bars.

A disadvantage of conventional cam assemblies is that the baffle is formed from a soft material such as low carbon, non-hardened steel or plastic/composite. As a result, the loading on the cam followers causes mounting spacers to "peen" the soft material of the baffle. Consequently, the bolt may lose its clamp load, thereby resulting in potential disengagement of the cam followers from the cam track, or worse, the bolt may break thereby resulting in disassembly of the cam assembly and failure of the reel.

SUMMARY OF THE INVENTION

In accordance with an exemplary embodiment there is provided a follower assembly of a cam assembly for a harvester reel comprising a baffle, a compressible member adjacent the baffle, and a roller spacer adjacent the compressible member. The follower assembly further comprises a tubular cam follower surrounding the roller spacer, and a fastener extending through the tubular cam follower, the roller spacer, the compressible member and the baffle.

An aspect of the exemplary embodiment is that the roller spacer includes an annular body and an annular flange extending from the annular body, wherein the compressible member circumscribes the annular body and the annular flange has an overall diameter larger than an inner diameter of the compressible member. In addition, the baffle includes a through hole and the annular body is seated within the through hole.

In accordance with another exemplary embodiment there is provided a cam assembly for a harvester reel comprising the above-described follower assembly.

In accordance with another exemplary embodiment there is provided harvester reel for an agricultural harvester comprising a cam assembly for a harvester reel including the above-described follower assembly.

The resultant follower assembly provides a construction which minimizes peening of the baffle, whereby the fastener maintains its clamp load such that the cam followers maintain engagement with the cam track and the potential for breakage of the bolt is minimized.

Other features and advantages of the subject disclosure will be apparent from the following more detail description of the exemplary embodiments.

BRIEF DESCRIPTION OF THE DRAWINGS

The foregoing summary, as well as the following detailed description of the exemplary embodiments of the subject disclosure, will be better understood when read in conjunction with the appended drawings. For the purpose of illustrating the present disclosure, there are shown in the drawings exemplary embodiments. It should be understood, however, that the subject application is not limited to the precise arrangements and instrumentalities shown.

DETAILED DESCRIPTION OF THE DRAWINGS

Figure 1:
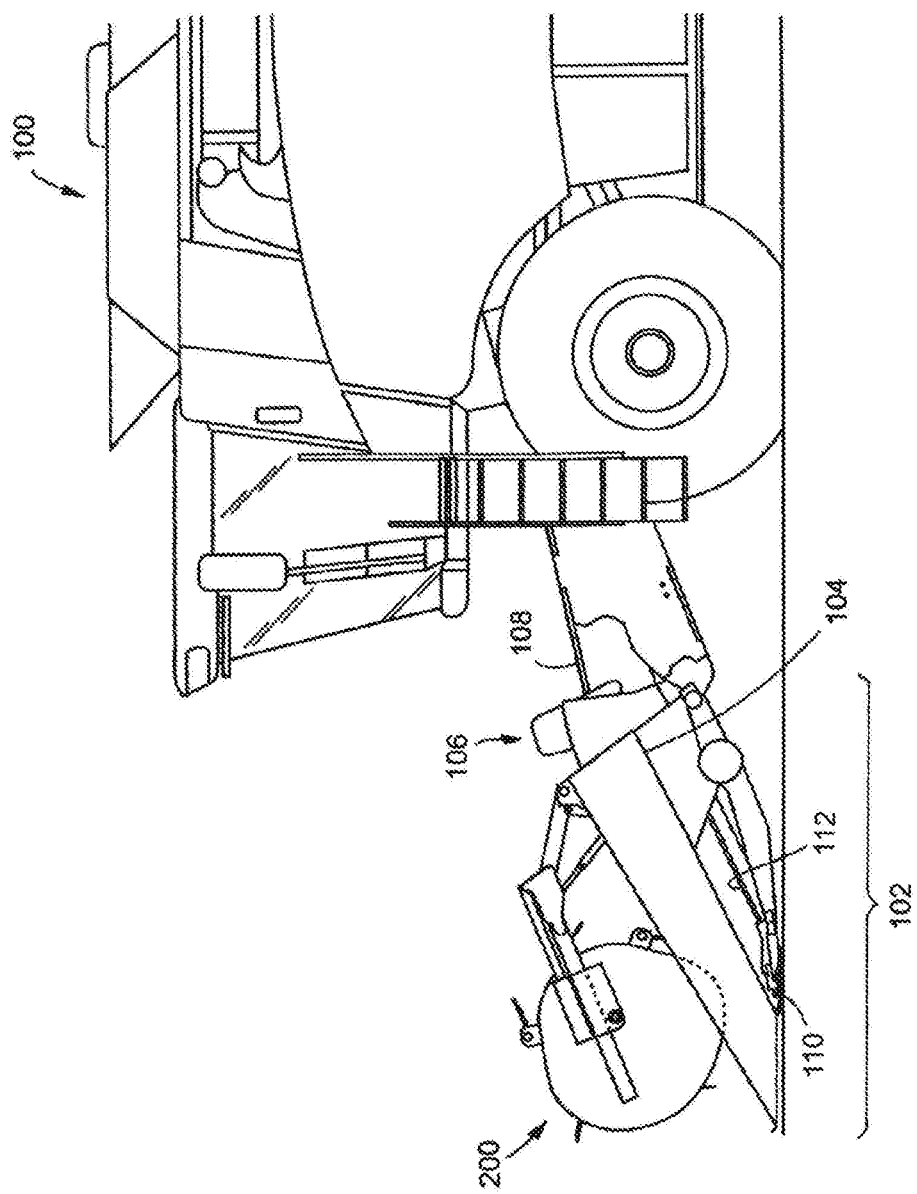
FIG. 1 is a side elevation view of an agricultural harvester including a harvester reel in accordance with an exemplary embodiment of the subject disclosure.

Reference will now be made in detail to the various exemplary embodiments of the subject disclosure illustrated in the accompanying drawings. Wherever possible, the same or like reference numbers will be used throughout the drawings to refer to the same or like features. It should be noted that the drawings are in simplified form and are not drawn to precise scale. Certain terminology is used in the following description for convenience only and is not limiting. Directional terms such as top, bottom, left, right, above, below and diagonal, are used with respect to the accompanying drawings. The term "distal" shall mean away from the center of a body. The term "proximal" shall mean closer towards the center of a body and/or away from the "distal" end. The words "inwardly" and "outwardly" refer to directions toward and away from, respectively, the geometric center of the identified element and designated parts thereof. Such directional terms used in conjunction with the following description of the drawings should not be construed to limit the scope of the subject application in any manner not explicitly set forth. Additionally, the term "a," as used in the specification, means "at least one." The terminology includes the words above specifically mentioned, derivatives thereof, and words of similar import.

The terms "grain," "ear," "stalk," "leaf," and "crop material" are used throughout the specification for convenience and it should be understood that these terms are not intended to be limiting. Thus, "grain" refers to that part of a crop which is harvested and separated from discardable portions of the crop material. The terms "debris," "material other than grain," and the like are used interchangeably.

"About" as used herein when referring to a measurable value such as an amount, a temporal duration, and the like, is meant to encompass variations of ±20%, ±10%, ±5%, ±1%, or ±0.1% from the specified value, as such variations are appropriate.

"Substantially" as used herein shall mean considerable in extent, largely but not wholly that which is specified, or an appropriate variation therefrom as is acceptable within the field of art.

Throughout the subject application, various aspects thereof can be presented in a range format. It should be understood that the description in range format is merely for convenience and brevity and should not be construed as an inflexible limitation on the scope of the subject disclosure. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, and 6. This applies regardless of the breadth of the range.

Furthermore, the described features, advantages and characteristics of the exemplary embodiments of the subject disclosure may be combined in any suitable manner in one or more embodiments. One skilled in the relevant art will recognize, in light of the description herein, that the subject disclosure can be practiced without one or more of the specific features or advantages of a particular exemplary embodiment. In other instances, additional features and advantages may be recognized in certain embodiments that may not be present in all exemplary embodiments of the present disclosure.

Referring now to the drawings wherein an exemplary embodiment of the present invention is shown, FIG. 1 illustrates an agricultural harvester 100 in accordance with an exemplary embodiment of the present invention. The agricultural harvester e.g., a combine harvester 100, includes a header 102 having a chassis or frame 104 which is attached to a forward end 106 of the harvester, more specifically to a feederhouse 108. The header 102 is configured to cut crops with a cutting apparatus 110 as the harvester 100 moves forward over a crop field, and includes at least one harvester reel 200 and a draper belt 112 for moving crop materials rearwardly, feeding the crop material to the harvester 100 through the feederhouse 108. In lieu of a draper belt, the header may employ an auger for moving crop materials rearwardly to the feederhouse.

Figure 2:
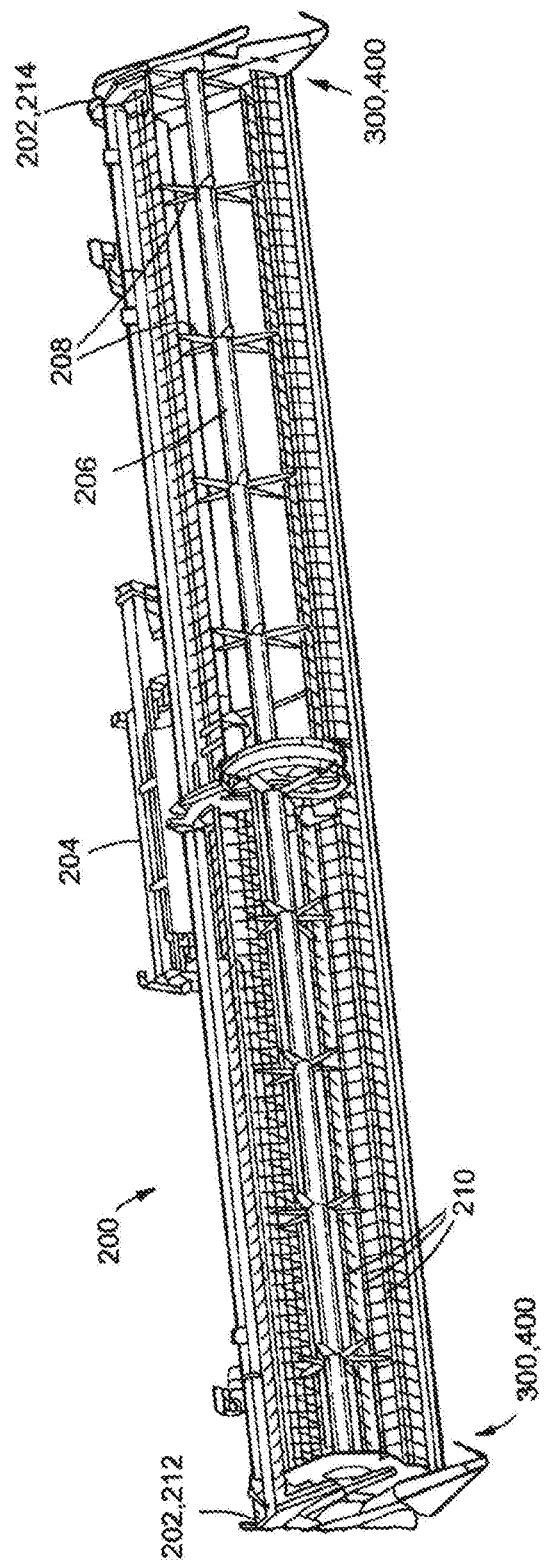
FIG. 2 is a front perspective view of a reel assembly of the harvester of FIG. 1 in accordance with an exemplary embodiment of the subject disclosure.

As best shown in FIGS. 1 and 2, the harvester reel(s) 200 span laterally and widthwise of the header 102. Each harvester reel 200 includes a reel assembly 201. The reel assembly further includes a mounting assembly 202 for mounting to a frame 204 of the header 102 or for mounting directly to the header.

The reel assembly 201 includes a central rotating shaft or axle 206 supporting spokes 208. Support members or tine bars 210A-F (FIG. 3A) are mounted to distal portions of the spokes and extend widthwise across the reel assembly. The central rotating shaft 206 is powered by the header 102 to drive operations of the reel.

Figure 3A:
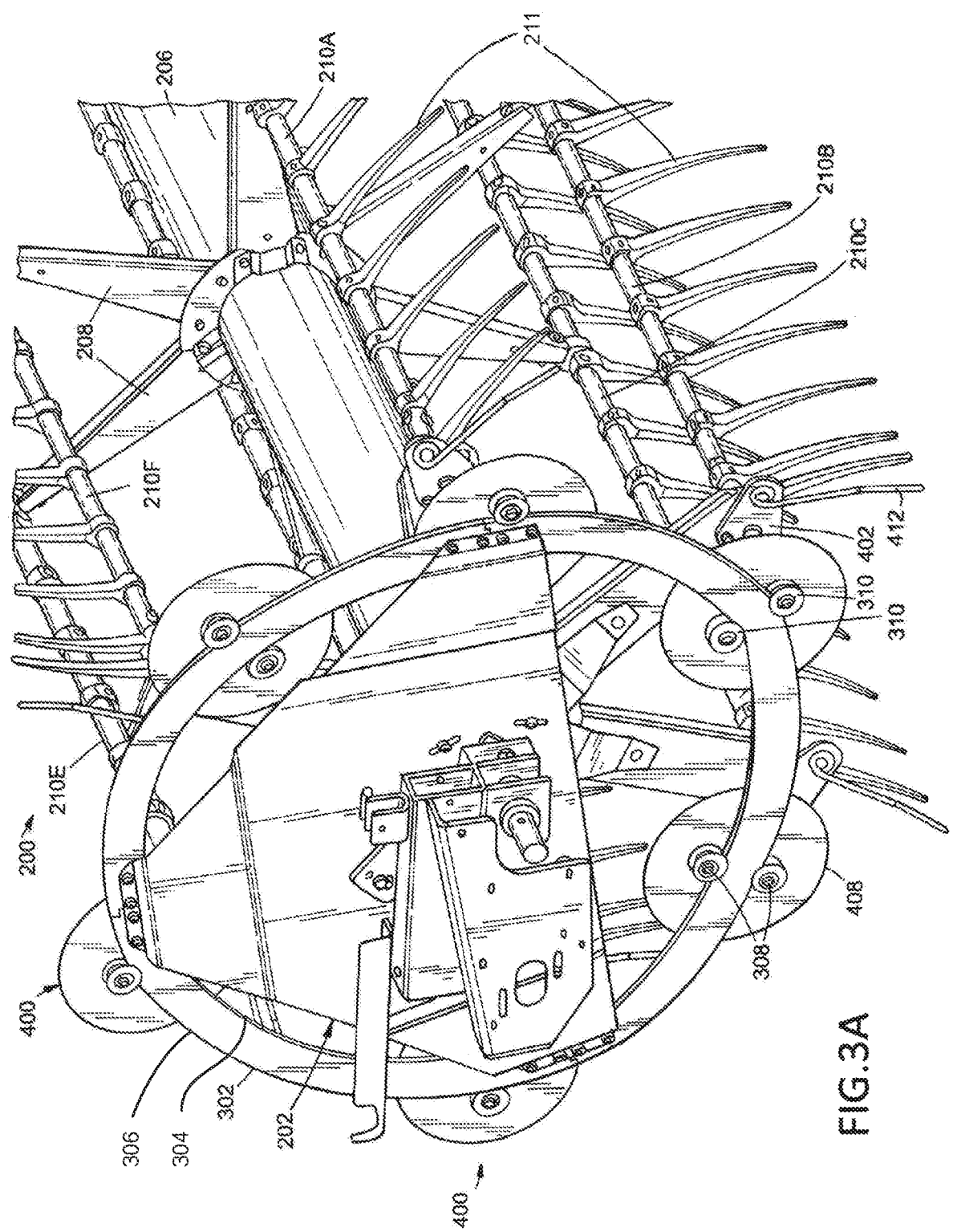
FIG. 3A is a perspective view of a cam assembly of the reel assembly of FIG. 2 in accordance with an exemplary embodiment of the subject disclosure.

As shown in FIGS. 2 and 3A, the support members 210A-F extend radially from the central rotating shaft 206 and are circumferentially spaced about the central rotating shaft via the spokes 208. The support members 210A-F are thus connected to the central rotating shaft for rotation therewith. The exemplary reel assembly 200 of the present invention is illustrated with six support members 210A-F, however more or fewer are contemplated.

Each support member or rod 210A-F includes a plurality of tines 211 for gathering and directing crop downwardly and rearwardly into the header 102 for subsequent cutting and harvesting operations.

The reel assembly 200 has lateral ends 212, 214 that each include a mounting assembly 202 for attaching the reel assembly to the header 102. The lateral ends 212, 214 of the reel assembly 200 include a cam assembly 300 and a cam follower assembly or, simply, follower assembly 400, as further described below. The reel assembly can alternatively include cam assemblies about other locations besides its lateral sides. In other words, the cam assembly is connected to the reel assembly.

Figure 3B:
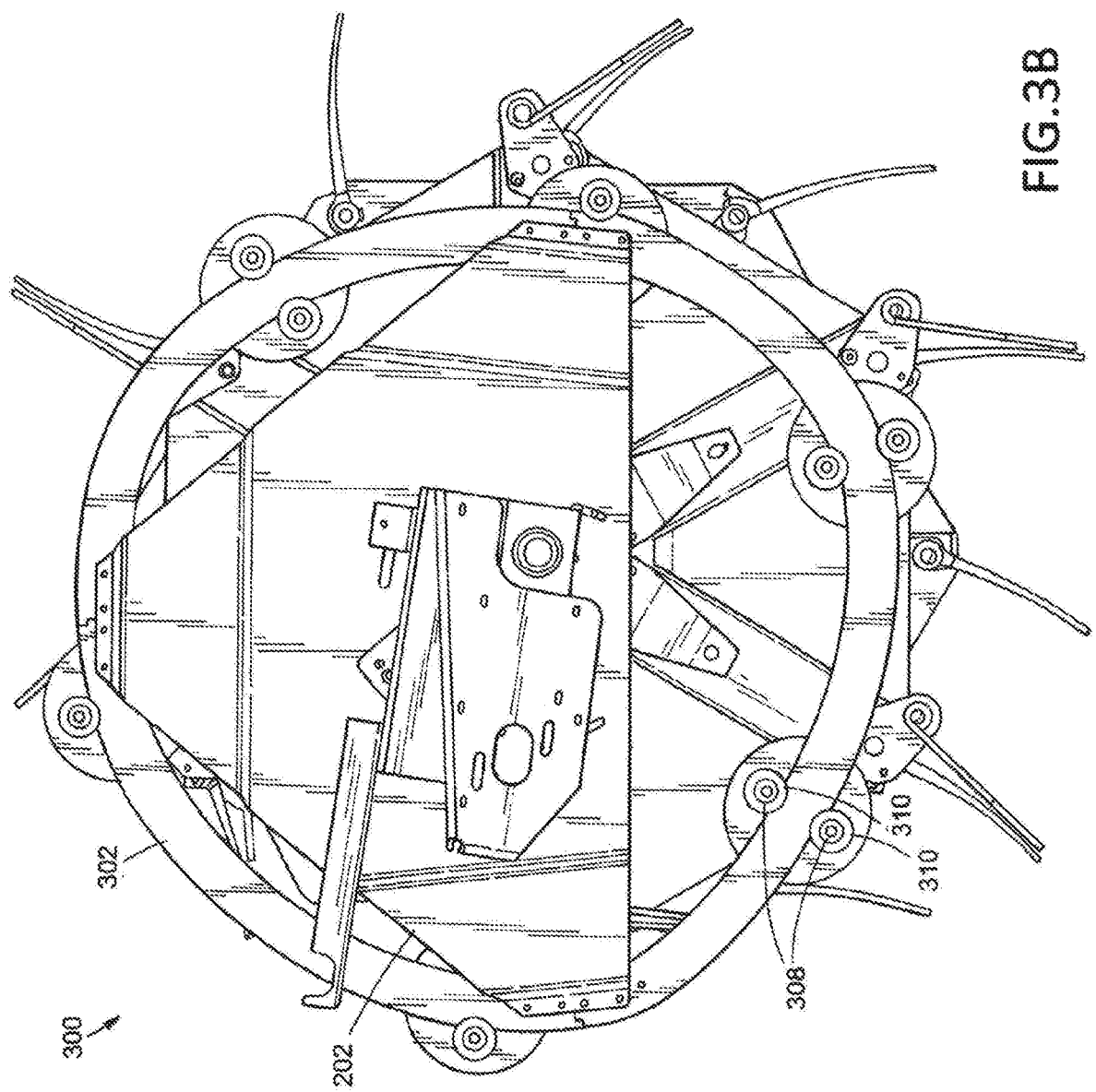
FIG. 3B is a side elevation view of the cam assembly of FIG. 3A.

Referring now to FIGS. 3A and 3B, the cam assembly or guide assembly 300 of the reel assembly 200 is illustrated. The cam assembly 300 includes a cam track 302, also referred to as a guide, which is fixedly attached to the mounting assembly 202. The cam track 302 is generally circular or oval shaped and may be formed of multiple parts or integrally formed. The cam track 302 has an inner surface 304 and an outer surface 306, and is connected to the reel assembly. Preferably, the cam track is connected to a lateral end of the reel assembly. In particular, the cam assembly is connected to one of the plurality of support members.

A plurality of cam followers 308 are spaced about the cam track 302 for engaging the cam track. According to an aspect, each of the cam followers 308 is a pair of roller bearings 310. The roller bearings 310 are positioned to engage the inner surface 304 and the outer surface 306 of the cam track 302.

Figure 4:
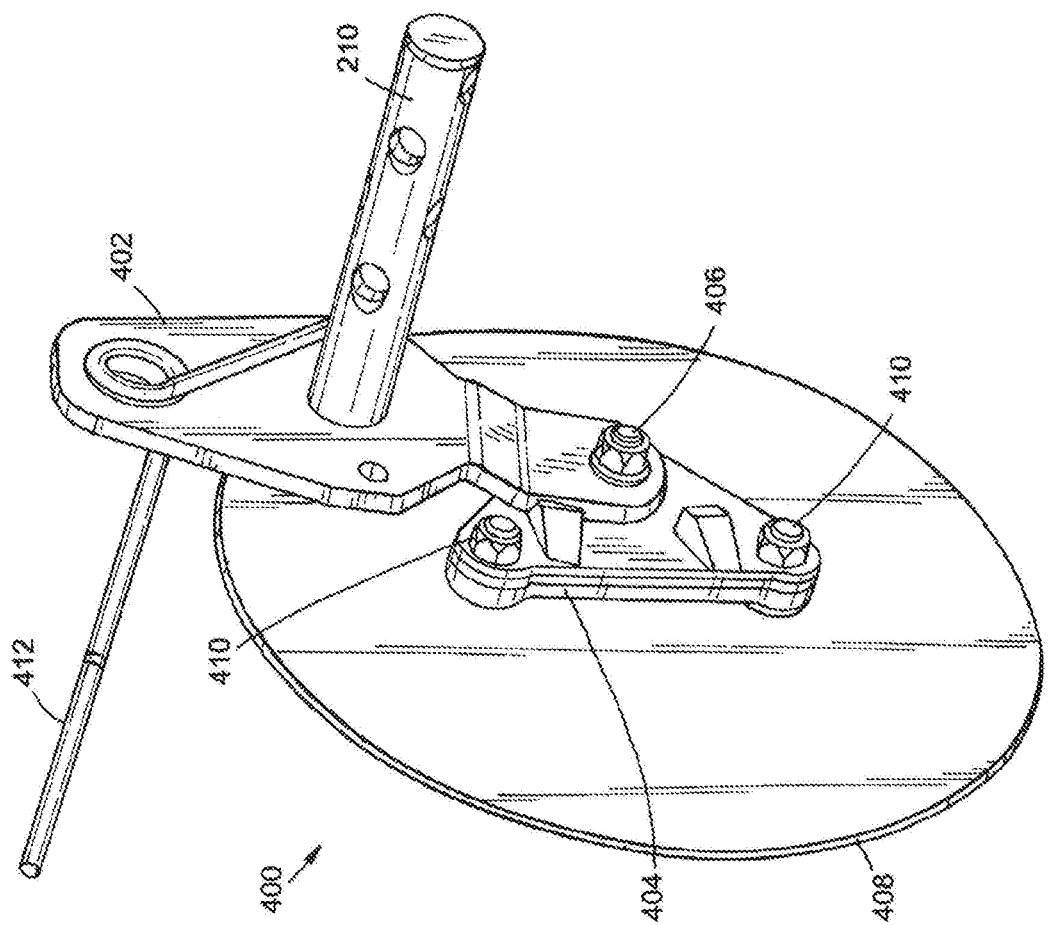
FIG. 4 is a partial perspective view of a follower assembly of the cam assembly of FIG. 3A.

FIG. 4 shows the follower assembly 400. A crank plate 402 is rigidly mounted on the support member 210 at a lateral distal end 212 or 214 of the support member. A bracket 404 is mounted to the crank plate 402 via a pivot joint 406. A baffle 408 is fixedly mounted to the bracket 404 by a plurality of connectors 410. The connectors 410 extend through the baffle 408 to rotatably support the cam followers 308. The follower assembly guides movement of the support member, and the follower engages the guide assembly.

The crank plate 402 also includes a finger 412 that functions similarly to tines 212 in guiding crop toward harvesting operations. The finger 412 may be resilient and may be mounted to the crank plate 402 with a torsional spring base, so as to accommodate forces experienced during use. Additional details of the follower assembly are provided in connection with the discussion of FIGS. 6 and 7 below.

The baffle 408 is illustrated as a substantially flat circular disc or plate, but may be provided as a convex or concave disc, or a non-circular shaped disc, e.g., a star shaped disc, a sickle-shaped disc and the like. Such non-circular shaped discs would further facilitate shredding of crop material about the cam assembly. The baffle can optionally be configured to include sharpened edges to facilitate the cutting and shredding of crop material and MOG, e.g., to prevent wrapping of such crop material about the cam assembly parts.

The baffle 408 is positioned between the cam follower 308 and a respective one of the plurality of support members 210A-F. Alternatively, the baffle can be positioned about a lateral side of both the cam follower and a respective one of the plurality of supper members. Further, the cam assembly can alternatively be configured to include a pair of baffles about the lateral sides of the cam follower such that the cam follower is between the pair of baffles.

The baffle 408 is sized to span and overlap the bearings 310 that constitute the cam follower 308, so as to prevent crop material from collecting around and between the cam follower 308 and the cam track 302. To this end, a diameter or width of the baffle 408 may be about two or three times greater than a span length between the bearings 310. Preferably, the overall diameter of the baffle is sized to be at least about an overall diameter defined by centers of a pair of cam followers 308, and no larger than a diameter such that an outer edge remains within a space defined by an outer end of a tine on the support member. In a configuration with only a single cam follower, the overall diameter of the baffles is sized to be at least slightly greater, e.g., 10% greater than an overall diameter of the single cam follower.

During use, the pivotal connection between the crank plate 402 and the bracket 404 allows the follower assembly 400 to accommodate the shape of the cam track 302. The central rotating shaft 206 is powered via the header 102 to rotate, causing the support members 210A-F to revolve around the shaft, while the cam assembly 300 and follower assembly 400 guide the path of the support members.

The baffle 408 provides two modes for preventing crop accumulation. First, the baffle 408 is positioned inboard of the cam track 302 and cam follower 308, so as to prevent crop from passing outward from the support members 210A-F and tines 212. Second, the baffle 408 is sized to overlap and extend beyond the cam track 302 and cam follower 308, therefore deflecting crop that is in the path of the reel assembly 200 rotation or in the path of forward motion of the harvester.

Figure 5:
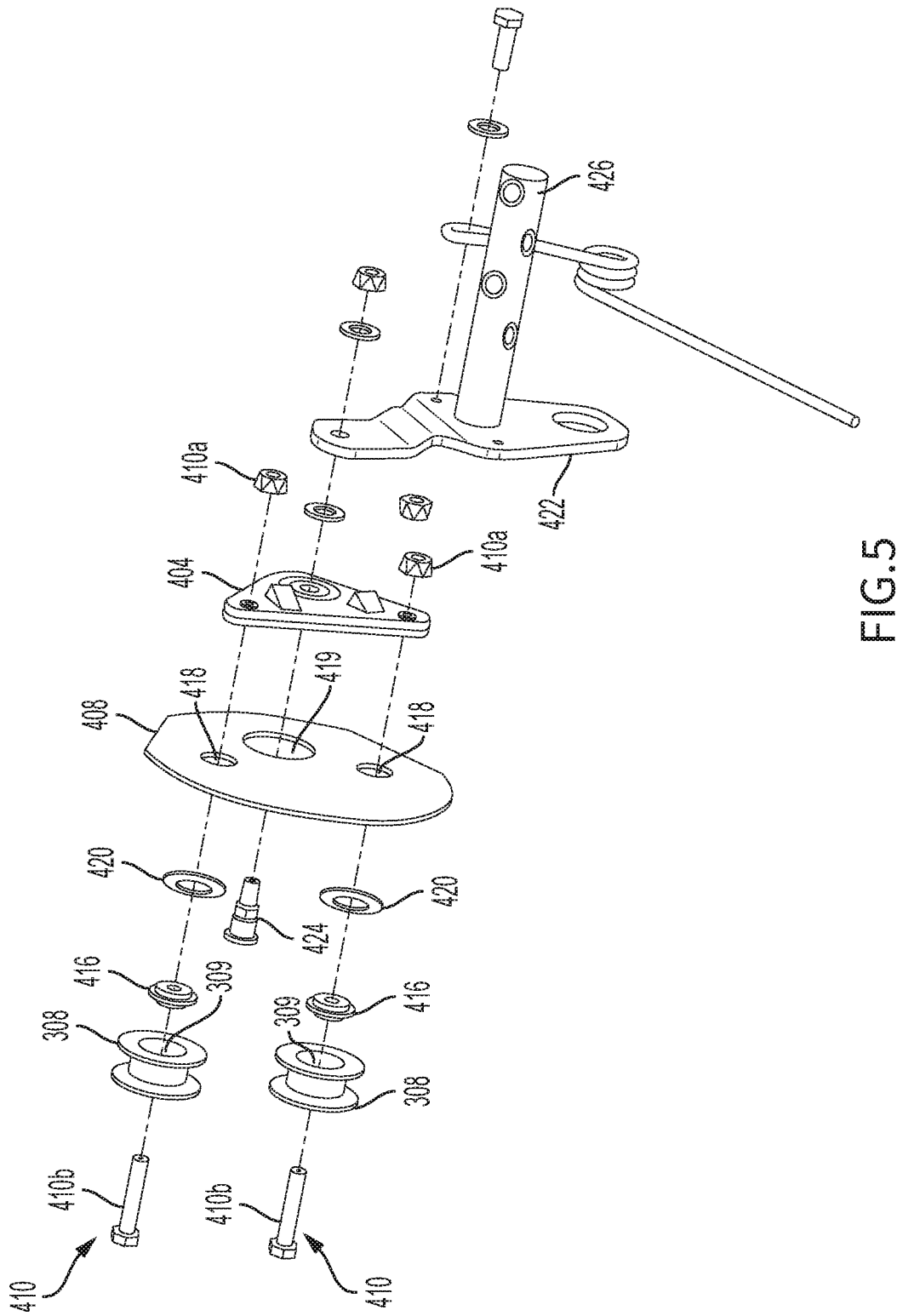
FIG. 5 is an exploded view of the follower assembly of the cam assembly of FIG. 3A.
Figure 6:
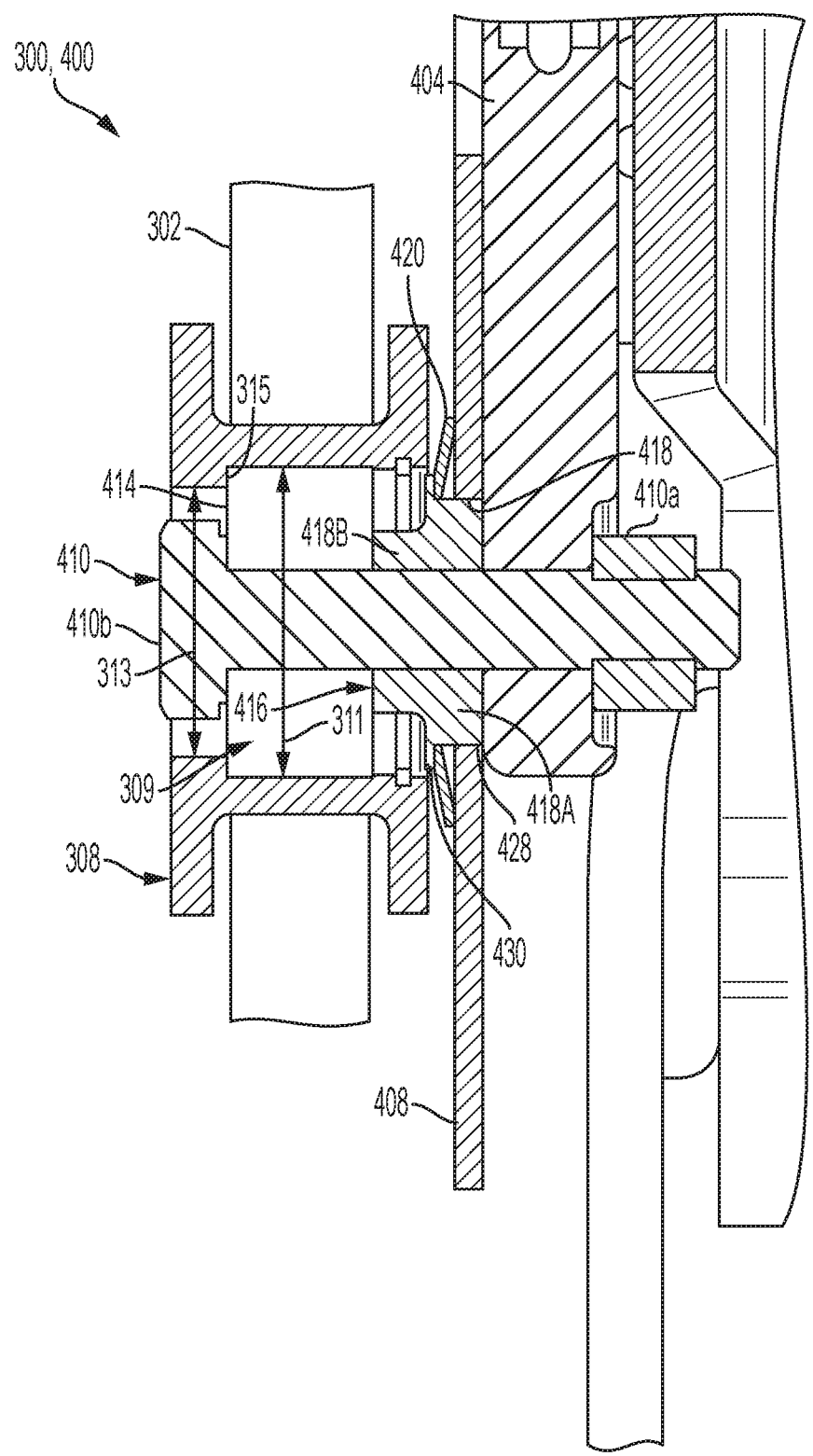
FIG. 6 is a cross-sectional view of a portion of a follower assembly of the cam assembly of FIG. 3A.

FIGS. 5 and 6 show in exploded and assembled views, respectively, a portion of the follower assembly 400 of the cam assembly 300 constructed in accordance with the subject disclosure, with certain elements omitted for clarity of illustration. Referring first to FIG. 5, the cam assembly 300 is shown to include a plurality of tubular cam followers 308 that engage an unillustrated cam track, a baffle 408, a fastener 410, and a roller spacer 416.

The tubular cam follower 308 may be configured as best shown in FIGS. 5 and 6. The tubular cam follower is substantially spool-shaped having a through hole 309. Further, as best shown in FIG. 6, the tubular cam follower 308 includes a first inner diameter 311 and a second inner diameter 313 having an internal diameter smaller than the first inner diameter. As such, the tubular cam follower 308 includes a step 315 for engaging and receiving a bearing or bushing 414, as further discussed below.

The bearing or bushing 414 is mounted within the tubular cam follower 308, as best shown in FIG. 6, to reduce rolling friction of the cam follower about the fastener 410. In accordance with an exemplary embodiment, the bearing or bushing 414 is an annular bushing slidable within the through hole 309 along a longitudinal direction of the through hole and/or rotatable within the through hole about a longitudinal axis of the bushing. In the alternative, the tubular cam follower 308 may include an integrally mounted internal bearing, i.e., a bearing that is inseparable from the tubular cam follower.

The baffle 408 is configured as best shown in FIGS. 5 and 6. The baffle 408 includes one or more through holes 418 sized and shaped to receive respective fasteners 410. The baffle includes an additional through hole 419 for receiving another fastener 424 for attaching to the bracket 404. The baffle can be formed from any suitable material, e.g., low carbon, non-hardened steel or plastic/composite.

The roller spacer 416 may be configured as shown in FIGS. 5 and 6. The roller spacer 416 includes an annular body 428 and an annular flange 430 radially extending outwardly from the annular body about its midportion. The annular body 428 includes a first annular section 418A and a second annular section 418B having an overall diameter smaller than an overall diameter of the first annular section. In an exemplary aspect the first annular section has height substantially the same as a height of the second annular section.

When assembled, the roller spacer 416 is positioned within the cam follower 308. The second annular section abuts the bearing or bushing 414 and the first annular section abuts the bracket 404. The annular body 428 of the roller spacer is also seated in the though hole 418 of the baffle 408.

A compressible member 420 is configured as best shown in FIGS. 5 and 6. According to an aspect, the compressible member may be a Belleville washer or other suitable compressible annular member such as a rubber or elastomeric washer. In the illustrated embodiment, the compressible member is a Belleville washer. When assembled, the Belleville washer is mounted on the roller spacer 416 so as to be adjacent the baffle 408 and the annular flange of the roller spacer. The Belleville washer 420 is formed as a conical annular ring that is compressible by the annular flange 430 of the roller spacer 416 in the direction of the baffle 408 when the fastener 410 compressingly engages the tubular cam follower 308, the roller spacer 416, the Belleville washer 420 and the baffle 408. The hole or opening of the Belleville washer is sized to receive the first annular section 418A of the roller spacer but smaller than the diameter of the annular flange 430. Referring again to FIG. 6, the Belleville washer 420 circumscribes the annular body 428 of the roller spacer. In addition, the annular flange 430 of the roller spacer has an overall diameter larger than an inner diameter of the of the Belleville washer.

By being seated in the through hole 418 of the baffle 408, the roller spacer 416 exerts little to no pressure on the baffle 408 during operation. Consequently, the fastener 410 retains its clamp load on the bracket 404, thereby minimizing the likelihood of potential disengagement of the cam follower 308 from the cam track or breakage of the fastener. That is, the first annular section 418A of the roller spacer 416 abuts the bracket 404 as opposed to the baffle 408 whereby peening of the baffle is avoided.

FIGS. 5 and 6 further illustrate that the bracket 404 is adjacent the baffle 408 and that the fastener 410 extends through the bracket. As shown most clearly in FIG. 5, the follower assembly additionally comprises a crank plate 422 and another fastener 424 for extending through the crank plate and securing the crank plate to the bracket 404. Further, a support member 426 extends from the crank plate 422.

According to an aspect, the fastener 410 extends through and secures together the tubular cam follower 308, the roller spacer 416, the Belleville washer 420 and the baffle 408. In the illustrated exemplary embodiment, the fastener 410 compressingly engages the tubular cam follower 308, the roller spacer 416, the Belleville washer 420 and the baffle 408 together. Each of the fasteners 410 may be, e.g., a rivet, a pin or, as illustrated, a nut 410a and a bolt 410b.

According to an aspect, there is provided a cam assembly 300 (FIG. 3B) comprising the follower assembly 400. In particular, the follower assembly comprises a baffle 408, a compressible member, e.g., a Belleville washer 420 adjacent the baffle, and a roller spacer 416 adjacent the Belleville washer. The follower assembly further includes a tubular cam follower 308 housing the roller spacer, and a fastener 410 extending through the tubular cam follower, the roller spacer, the Belleville washer and the baffle.

According to a further aspect, there is provided a cam assembly comprising a second follower assembly similar to follower assembly 400. In particular, the second follower assembly comprises a baffle, a compressible member, e.g., a Belleville washer adjacent the baffle, and a roller spacer adjacent the Belleville washer. The second follower assembly further includes a tubular cam follower housing the roller spacer, and a fastener extending through the tubular cam follower, the roller spacer, the Belleville washer and the baffle.

As shown in FIGS. 3B and 6, the cam assembly 300 comprises the cam track 302. The follower assembly engages the cam track via the cam follower 308.

According to a further aspect, there is provided a harvester reel 200 comprising the cam assembly 300 including the follower assembly 400. The harvester reel further comprises the reel assembly 201 including the central rotating shaft 206 and the plurality of support members 210A-F extending widthwise across the reel assembly and connected to the central rotating shaft for rotation therewith (FIGS. 2 and 3A).

It will be appreciated by those skilled in the art that changes could be made to the exemplary embodiments described above without departing from the broad inventive concept thereof. It is to be understood, therefore, that this disclosure is not limited to the particular embodiments disclosed, but it is intended to cover modifications within the spirit and scope of the subject disclosure as defined by the appended claims.

I claim:

1. A follower assembly of a cam assembly for a harvester reel comprising
    a baffle;
    a compressible member contacting the baffle;
    a roller spacer mounted to the baffle and having an annular flange biasing the compressible member against the baffle, whereby the baffle circumscribes the roller spacer;
    a tubular cam follower surrounding the roller spacer; and
    a fastener extending through the tubular cam follower, the roller spacer, the compressible member and the baffle.

2. The follower assembly of claim 1, further comprising a bracket adjacent the baffle, and wherein the fastener extends through the bracket.

3. The follower assembly of claim 2, further comprising a crank plate adjacent the bracket, and another fastener extending through the crank plate.

4. The follower assembly of claim 3, further comprising a support member extending from the crank plate.

5. The follower assembly of claim 1, wherein the roller spacer includes:
    an annular body.

6. The follower assembly of claim 5, wherein the compressible member circumscribes the annular body.

7. The follower assembly of claim 1, wherein the annular flange has an overall diameter larger than an inner diameter of the compressible member.

8. The follower assembly of claim 5, wherein the baffle includes a through hole and the annular body is seated within the through hole.

9. The follower assembly of claim 1, wherein the fastener secures the tubular cam follower, the roller spacer, the compressible member and the baffle together.

10. The follower assembly of claim 1, wherein the fastener compressingly engages the tubular cam follower, the roller spacer, the compressible member and the baffle together.

11. The follower assembly of claim 1, wherein the baffle comprises low carbon, non-hardened steel or plastic.

12. The follower assembly of claim 1, wherein the compressible member is a Belleville washer.

13. A cam assembly for a harvester reel comprising the follower assembly of claim 1.

14. The cam assembly of claim 13, further comprising a second follower assembly of claim 1.

15. The cam assembly of claim 13, further comprising a cam track, wherein the follower assembly engages the cam track.

16. A harvester reel for an agricultural harvester comprising the cam assembly of claim 13.

17. The harvester reel of claim 16, further comprising a reel assembly including:
    a central rotating shaft, and
    a plurality of support members extending widthwise across the reel assembly and connected to a central rotating shaft for rotation therewith.

18. The follower assembly of claim 1, wherein the compressible member is between the roller spacer and the baffle.

19. The follower assembly of claim 1, wherein the compressible member is between the annular flange and the baffle.

20. The follower assembly of claim 1, further comprising a bracket adjacent the baffle, wherein the roller spacer abuts the bracket.

* * * * *